M. H. LOCKWOOD.
TYPE WRITING MACHINE.
APPLICATION FILED JULY 7, 1910.
1,006,489.
Patented Oct. 24, 1911.
2 SHEETS—SHEET 1.
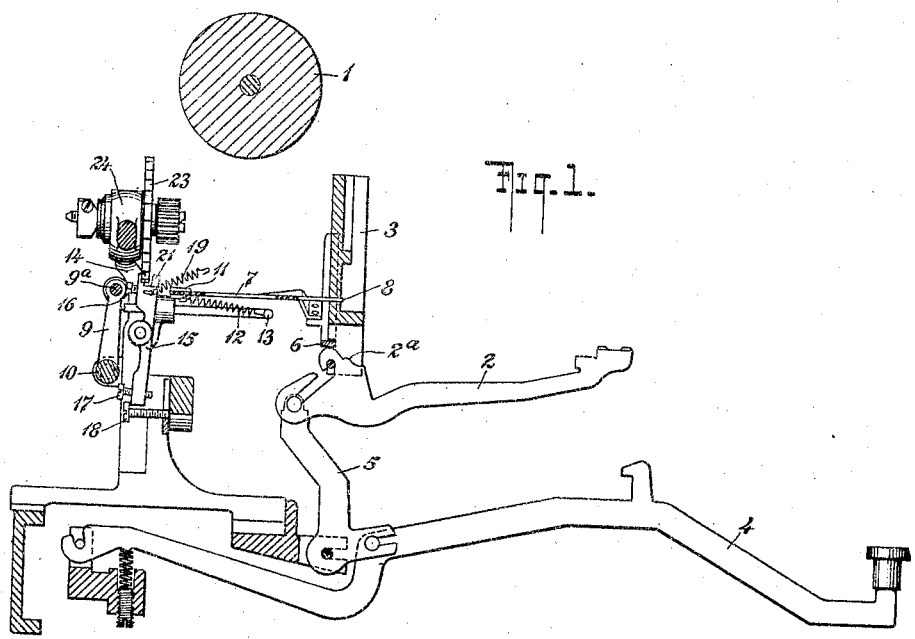
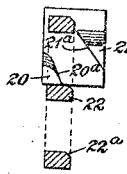
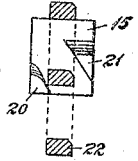
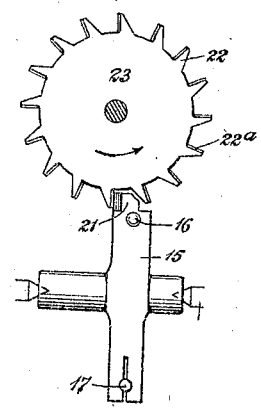
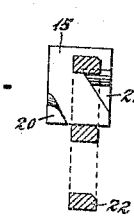
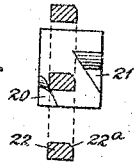
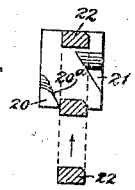
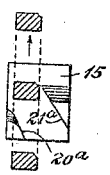
WITNESSES:
INVENTOR
Marquis H. Lockwood
BY
ATTORNEYS M. H. LOCKWOOD.
TYPE WRITING MACHINE.
APPLICATION FILED JULY 7, 1910.
1,006,489.
Patented Oct. 24, 1911.
2 SHEETS—SHEET 2.
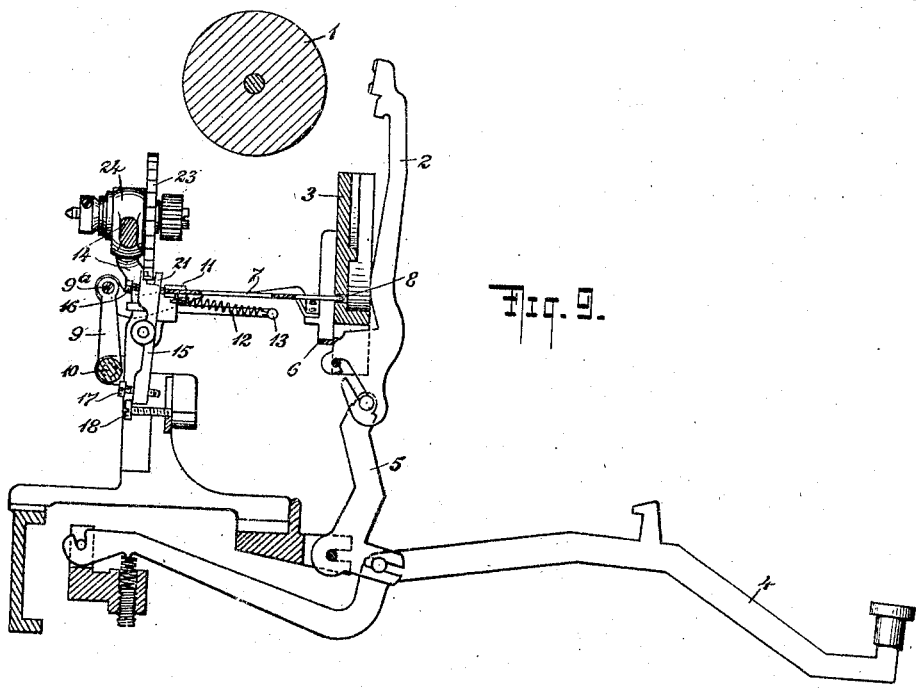
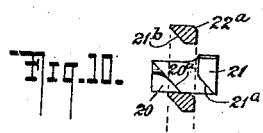
Fig. 10.
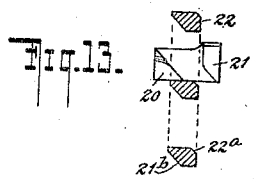
Fig. 13.
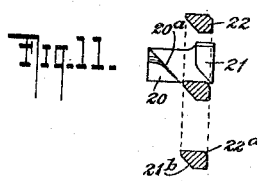
Fig. 11.
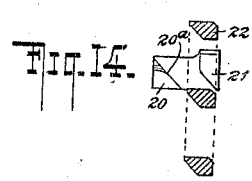
Fig. 14.
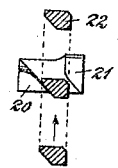
Fig. 12.
WITNESSES:
G. V. Rasmussen
John A. Kleinheck
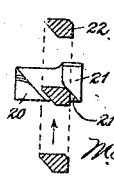
Fig. 15.
INVENTOR
Marquis H. Lockwood
BY
Nielsen Knauth
ATTORNEYS

UNITED STATES PATENT OFFICE.

MARQUIS H. LOCKWOOD, OF NEW YORK, N. Y., ASSIGNOR TO UNDERWOOD TYPEWRITER COMPANY, OF NEW YORK, N. Y., A CORPORATION OF NEW YORK.

TYPE-WRITING MACHINE.

1,006,489. Specification of Letters Patent. Patented Oct. 24, 1911.

Application filed July 7, 1910. Serial No. 570,732.

*To all whom it may concern:*

Be it known that I, MARQUIS H. LOCKWOOD, residing in the borough of Manhattan, city, county, and State of New York, have invented certain new and useful Improvements in Type-Writing Machines, of which the following is a full, clear, and exact description, such as will enable others skilled in the art to which it appertains to make and use the same.

My invention relates particularly to escapement mechanisms and is here shown applied to the well known Underwood typewriter, which at present employs an escapement mechanism wherein a fixed and loose dog are used; the coacting parts conforming in shape and function to the dogs and rack teeth as shown and described in the Dyett Patent, No. 673,426. I propose to employ two fixed dogs on an independently mounted dog rocker in connection with a universal bar mechanism which releases the escapement by means of a hammer blow which is delivered at the upper end of the dog rocker. By this hammer blow, the normally holding dog is whipped out of the rack whereby the rack and carriage are released instantly when the type is very near the printing point and the printing will be done before the carriage has had time to move a perceptible amount. After printing, the typebar rebounds and quickly starts on its return to normal position thus permitting the universal bar mechanism to return rapidly to its initial position so that the independently mounted dog rocker is free to reëngage the rack as soon as the carriage has moved forward sufficiently for the normally holding dog to reënter the rack.

By having the dog rocker independently mounted as shown, it does not necessarily move in unison with the universal bar mechanism on its return stroke and hence the back of the normally engaging dog may slide down the back of a tooth of the escapement wheel when the carriage does not move fast enough as pointed out later and shown diagrammatically in some of the figures.

The object of my improvement is to reduce the number of working parts in the escapement and provide a simple and efficient typewriter escapement which may be operated satisfactorily either by high speed or by slow speed operators.

Figure 1 represents a vertical section of the key action, universal bar and my escapement mechanism; Figs. 2 to 7 inclusive show diagrammatically the consecutive steps in the operation of the escapement dogs and rack; Fig. 8 is a view of the dog rocker and escapement wheel in elevation; Fig. 9 is another view similar to Fig. 1 but in which the escapement is operated without the dog rocker spring; Figs. 10 to 12 inclusive show diagrammatically the operation of a modification; and Figs. 13 to 15 inclusive diagrammatic views of a different mode of operation.

Similar letters of reference refer to like parts throughout the specification and drawings.

In the drawings, 1 represents the platen; 2 the typebar, pivoted in the hanger bracket 3. The typebar is operated by the key 4 through the intermediate bell crank lever 5.

In operation, the heel $2^a$ of the type bar strikes the universal bar 6 which is attached to a reciprocating frame 7, the front end of which carries the bar extension 8 which slides in a slot in the bracket 3. The other end of the frame 7 is pivotally secured to the arms 9 by the transverse rod $9^a$. The arms 9 are secured to the rockshaft 10, thereby permitting the frame 7 to reciprocate back and forth as hereinafter explained. The reciprocating frame 7 bears an enlargement at 11 which serves as a hammer to actuate the dog rocker in the manner and for the purpose hereinafter described. The universal bar 6 and frame 7 are held in and returned to the forward initial position by means of the spring 12, one end of which is secured to the frame 7 and the other to a post 13 secured to the frame bracket 14. Independently mounted in bracket 14 for vibration transversely with respect to the rack or escapement wheel is the dog rocker 15 which is limited in its transverse motion by the screws 16 and 17 in the dog rocker and the head of the screw 18 in the bracket 14. The upper end of the dog rocker is held under tension toward the front or toward the right in Fig. 1 by the spring 19 the motion of the dog rocker being limited in this direction by the head of the screw 18. The spring 19 may be dispensed with when the escapement operates in the manner hereinafter described.

I have provided the upper end of the dog rocker with two fixed dogs 20 and 21, spaced apart and separated by an angular channel for the passage of a tooth 22 of the escapement rack or wheel 23 which is revolubly mounted in the bearing 24, and is driven in the usual manner from the power driven carriage carrying the platen 1. The relative positions of the two fixed dogs 20 and 21 is shown in the diagrams Figs. 2 to 7, and 10 to 15, inclusive.

It will be seen that the angular channel between the dogs is formed by beveling the rear of the dog 20 as 20ª and the forward inner corner of the dog 21 as 21ª, the angle being substantially 45°, although it may be varied to suit the requirements; thus providing each dog with a single working face opposed to the forward movement of the rack.

One corner of each rack tooth 22 is beveled at 22ª practically parallel to and at the same angle as the bevel 21ª of the dog 21; thus providing the working face of each tooth with a straight portion and an angular portion which cooperate respectively with the straight face of the dog 20 and the angular face of the dog 21 in a manner hereinafter described.

In the modification represented in Fig. 9, the dog rocker returning spring 19, as shown in Fig. 1, has been removed and the dog rocker is returned to normal position, when the machine is operated, by the impact or camming action of the angular face 22ª of a tooth of the rack against the cam face 21ª of the normally disengaged fixed dog. This operation of the escapement is diagrammatically illustrated in Figs. 13 to 15 wherein Fig. 13 represents the dogs and rack in normal position; Fig. 14 represents the dogs at the end of the releasing transverse motion, the rack tooth being shown out of contact with either dog since the rack remains practically stationary during the instant of printing, due to the inertia of the heavy carriage; in Fig. 15 the rack tooth 22 is represented as in contact with and sliding down the cam face 21ª and thereby forcing the dog rocker back toward the normal position as shown in Fig. 13. When thus operated without the spring to return the dog rocker and hold it in normal position, there is a possibility of accidental displacement, though this is not likely, nevertheless to provide a means of retaining the dog rocker in its normal position when the rack rests on the plain face of the dog 20, the head of the screw 16 may be allowed to project far enough to contact with the transverse rod 9ª which secures the rock arms 9 to the universal reciprocating frame 7, which will prevent movement of the dog rocker until the universal frame 7 is moved.

In Figs. 10 to 15 inclusive, the shape of the teeth of the rack is shown as modified by having the back corners removed at an angle so that the plane 21ᵇ thus formed is practically parallel to the angular face 21ª, previously mentioned. Removing the corner of the teeth in this manner, makes it possible to reduce the amount of "drop" between the working faces of the two fixed dogs and thereby permit the dog rocker to begin its return to normal position sooner than with the other construction. The operation of the escapement will vary according to the speed and style of stroke used by the operator, but at all speeds of operation the printing will be done so quickly after the release of the rack tooth 22 from the plain faced dog 20 that the carriage is practically at rest and the parts will be in the position diagrammatically shown in Figs. 3, 11 and 14 of the drawings.

When operated with a staccato stroke on the keys the typebar will print and rebound from the platen so quickly that the hammer head 11 on the universal reciprocating frame 7 will get away from contact with the point of the screw 16 so as to permit of the position of parts represented in Fig. 4, because the rack has not had time to move a perceptible amount owing to the inertia of the carriage; after which, as the rack advances, the continued pull of the dog rocker spring 19 will cause the bevel 20ª on the back of the dog to follow the back of a rack tooth 22 as indicated in Figs. 5, 6 and 12, and during this operation, owing to the angular face 20ª tends to force the rack ahead and thus speed the carriage along, after which the rack and dogs return to normal position ready for the operation to be repeated.

When the keys are operated slowly or when the spring 19 is removed the parts during the various steps will assume the positions shown in the Figs. 13, 14 and 15 in which the power of the moving rack tooth is used to restore the dog rocker to normal. In actual practice I find that the device works satisfactorily either with or without the spring 19.

It will be understood that other modifications of the device may be made and still accomplish the result I have pointed out and the device may be used in connection with other machines and other key actions therefore I do not wish to be limited to the construction shown.

I claim:

1. An escapement for typewriters comprising a dog rocker provided with two fixed dogs each with a single working face, a rack arranged to travel transversely to the plane of movement of the dog rocker, teeth on said rack each having a working face provided with two straight portions at an angle to each other, each of said portions adapted to contact respectively with but one of said dogs.

2. An escapement for typewriters comprising a dog rocker provided with two fixed dogs each with a single working face, the working face of one dog being parallel to the plane of movement of said dog rocker and the working face of the other dog being at an angle to said plane, a rack arranged to travel transversely to the plane of movement of the dog rocker, teeth on said rack each having a working face consisting of two portions, one a straight portion parallel to and adapted to contact only with the dog having its working face parallel to the plane of movement of the dog rocker and the other a straight portion at an angle to the first portion and adapted to contact only with the dog having its working face at an angle to the plane of movement of the dog rocker.

3. An escapement for typewriters comprising a dog rocker provided with two fixed dogs, each with a single working face, the working face of one dog being parallel to the plane of movement of said dog rocker and the working face of the other dog being at an angle to said plane, a rack arranged to travel transversely to the plane of movement of the dog rocker, teeth on said rack each having a working face provided with straight portions parallel to and adapted to contact respectively with the corresponding working face of said dogs.

4. An escapement for typewriters comprising a dog rocker provided with two fixed dogs, each with a single working face, the working face of one dog being in the plane of movement of the dog rocker while the working face of the other dog is at an angle thereto and to the working face of the first named dog, a rack arranged to travel transversely to the plane of movement of the dog rocker, teeth on said rack each having a working face provided with a straight portion adapted to contact only with the dog having its working face in the plane of movement of the dog rocker and normally hold the rack, and a straight portion at an angle to the other portion and adapted to contact only with the dog having its working face at an angle to the plane of movement of the dog rocker, and return the dog rocker to normal position.

5. An escapement for typewriters comprising a dog rocker mounted for independent movement, two fixed dogs on said dog rocker each with a single working face, one at an angle to the other and to the plane of movement of the dog rocker, a rack arranged to travel transversely to the plane of movement of the dog rocker, teeth on said rack each having a working face consisting of two portions each corresponding respectively with the working face of the dog with which it is adapted to contact, and key actuated means for delivering a hammer blow to actuate said dog rocker.

6. An escapement for typewriters comprising a dog rocker mounted for independent movement, two fixed dogs on said dog rocker each having a single working face, one parallel to the plane of movement of the dog rocker and one at an angle to the other working face and to said plane of movement of the dog rocker, a rack arranged to travel transversely to the plane of movement of the dog rocker, teeth on said rack each having a working face consisting of two portions, one portion being parallel to and adapted to engage only the dog having its working face parallel to the plane of movement to the dog rocker to normally hold the rack, while the other portion is at an angle to the first named portion and adapted to engage the dog having its working face at an angle to the plane of movement of the dog rocker and restore the dog rocker to normal position, and key actuated means for delivering a hammer blow to move the dog rocker away from normal position.

7. An escapement for typewriters comprising a rack provided with teeth, each having a working face provided with two straight portions at an angle to each other, a dog rocker mounted to rock transversely to said rack, two fixed dogs on said dog rocker, each provided with a single working face, one at an angle to the other and to the plane of movement of the dog rocker, each dog adapted to be engaged only by the corresponding portion of the working face of a tooth.

8. An escapement for typewriters comprising a rack provided with teeth, each having a working face provided with two straight portions at an angle to each other, a dog rocker independently mounted to rock transversely to said rack, two fixed dogs on said dog rocker each provided with a single working face, one at an angle to the other and to the plane of movement of the dog rocker, each adapted to be engaged respectively only by the corresponding portion of the working face of a tooth, and key actuated means for delivering a hammer blow to actuate the dog rocker in one direction.

9. An escapement mechanism for typewriters comprising a rack, a pivoted dog rocker independently mounted to rock transversely to said rack provided with two fixed dogs in operable relation to said rack, key actuated means for actuating said dog rocker in one direction, means for returning said dog rocker to normal position independently of said key actuated means, and means acting in conjunction with said key actuated means for locking said dog rocker in normal position.

In testimony whereof I have hereunto set my hand in the presence of two subscribing witnesses.

MARQUIS H. LOCKWOOD.

Witnesses:
 JOHN A. KEHLENBECK,
 FRITZ ZIEGLER, Jr.